April 1, 1941.   R. POLK, SR., ET AL   2,236,916
FRUIT SEGMENTER AND JUICER
Filed Oct. 23, 1936   3 Sheets-Sheet 1

INVENTORS.
Ralph B. Polk Sr. and
Ralph Polk Jr.,
BY
Hood & Hahn.
ATTORNEYS.

April 1, 1941. R. POLK, SR., ET AL 2,236,916
FRUIT SEGMENTER AND JUICER
Filed Oct. 23, 1936 3 Sheets-Sheet 2

INVENTORS.
Ralph B. Polk Sr. and
BY Ralph Polk Jr.,
Hood + Hahn.
ATTORNEYS.

April 1, 1941.  R. POLK, SR., ET AL  2,236,916
FRUIT SEGMENTER AND JUICER
Filed Oct. 23, 1936  3 Sheets-Sheet 3
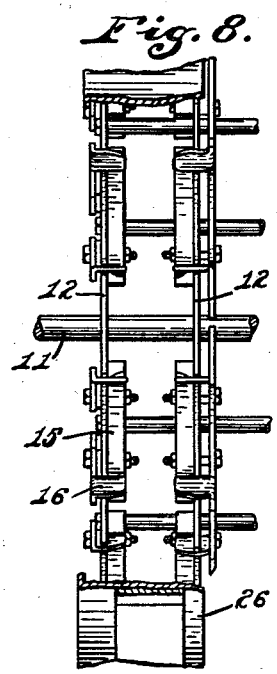
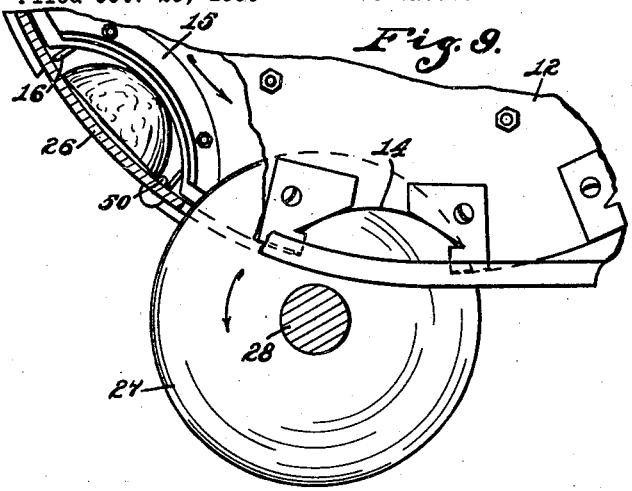
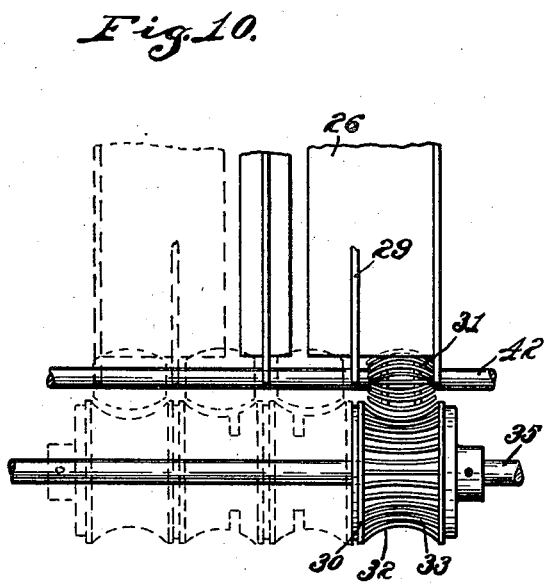
INVENTORS.
Ralph B. Polk Sr. and
BY  Ralph Polk Jr.,
Hood & Hahn.
ATTORNEYS.

Patented Apr. 1, 1941

2,236,916

UNITED STATES PATENT OFFICE 2,236,916

FRUIT SEGMENTER AND JUICER

Ralph Polk, Sr., Tampa, and Ralph Polk, Jr., Haines City, Fla., assignors to The Polk Development Company, Tampa, Fla., a copartnership Application October 23, 1936, Serial No. 107,208

25 Claims. (Cl. 146—3)

The object of our invention is to provide a new method and apparatus by means of which the juice and edible pulp of non-edible skin fruits, most generally of the citrus type, may be more rapidly extracted.

While our invention primarily relates to the handling of citrus fruits, it will be readily understood that some other types of fruits having a relatively tough non-edible skin may be similarly handled.

The juices of grape fruit, oranges, and lemons have heretofore been commercially packaged in large quantities and in the preparation of such juices, care must be exercised to avoid, as far as possible, such rupturing of the skin, during the juice extraction operation, as will result in material intermingling of the acrid oily juices of the skins with the pulp juices, and heretofore the common practice has involved the halving of the fruit and a reaming of the pulp from the hemispherical skin, a rotary reamer rotating upon an axis substantially normal to the cut face of the fruit half. In such an operation, the reamer must be projected axially into the fruit half and, after the reaming operation, must be axially withdrawn, and such operations are time consuming so that the operation of juice extraction has necessarily been relatively slow and, therefore, proportionately expensive.

Our present method and apparatus by which the method may be performed involves the segmentation of the fruit into segments having an included angle sufficiently limited to permit the passage of the segment polarwise between forwarding and juice expressing elements in rapid succession, without disturbing the operative relationship of those elements under such conditions that the normal arc of the skin is not materially modified, thereby avoiding cracking and crushing of the skin.

We have found that, most conveniently, segmentation of the fruit may be into quarters, i. e., each segment including an angle of about ninety degrees, but it will be readily understood that, while the included angle should preferably be substantially less than one hundred eighty degrees, that angle may be substantially less than ninety degrees.

The accompanying drawings illustrate one form of apparatus embodying our invention.

Fig. 8 is a fragmentary elevation of the fruit-forwarding head showing one series of half-fruit pockets;

Fig. 9 is a fragmentary side elevation, in partial vertical section, of the quartering cutter disc and adjacent parts; and Fig. 10 is a plan of an adjacent pair of juicer throats.

Figure 1:
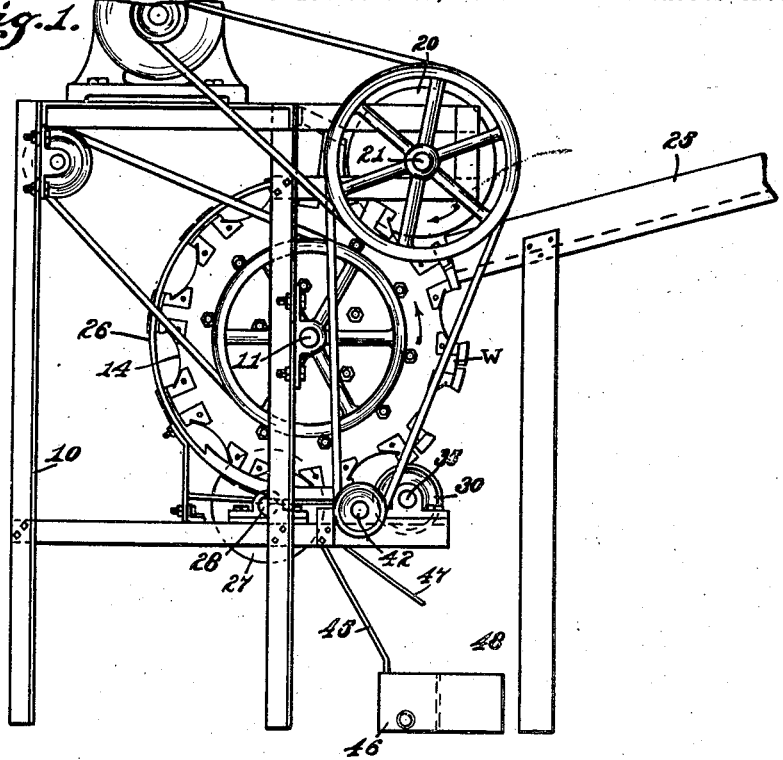
Fig. 1 is a side elevation.
Figure 3:
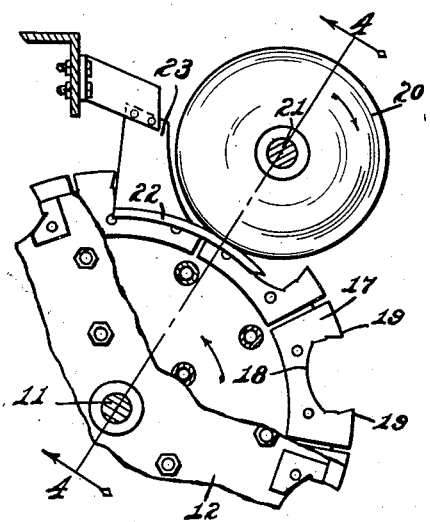
Fig. 3 is a fragmentary elevation, in partial vertical section, of the halving cutter disc and adjacent parts, with the feed chute omitted.
Figure 4:
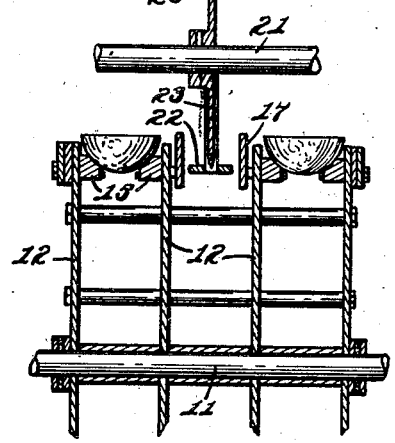
Fig. 4 is a section on line 4—4 of Fig. 3.
Figure 2:
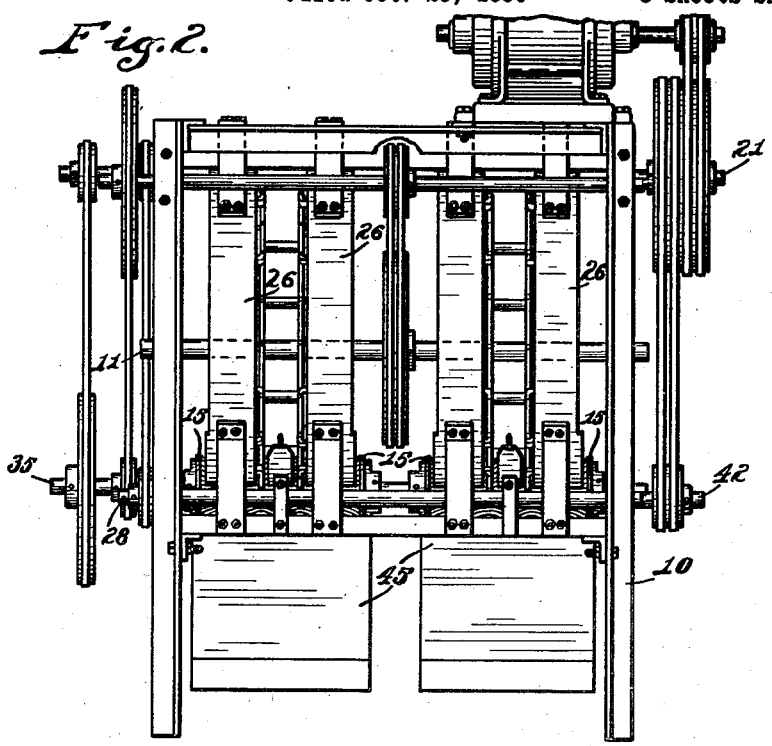
Fig. 2 is a rear end elevation.
Figure 5:
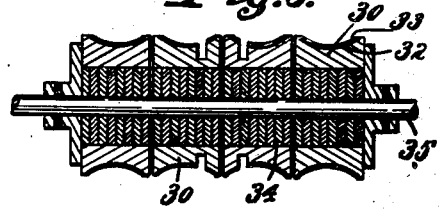
Fig. 5 is an axial section of a series of segment-forwarding elements of the juicer unit on line 5—5 of Fig. 6.

In the drawings, 10 indicates a suitable main frame in which is journaled a horizontal-axis shaft 11 which carries the fruit-forwarding wheel W. This head comprises coaxial discs 12, axially spaced at approximately an average fruit diameter and attached to shaft 11 to rotate therewith. Each of these discs is peripherally notched by a series of notches 14 and each of these notches is flanked, on the inner faces of each end pair of discs, with fruit-cradled segments 15, thereby forming a series of circumferentially spaced fruit cradles or pockets adapted to receive fruit halves. At each outer corner of each fruit cradle is an inwardly projecting ear 16 arranged to form an extended contactor for the fruit half adjacent its cut face.

Attached to the adjacent inner faces of the two middle discs 12, and aligned with each fruit-half cradle is a plate 17 notched in its outer edge at 18 so as to form, by each adjacent pair of plates, a whole-fruit receptacle or pocket having whole-fruit engaging tips 19. The bottoms of the notches 18 are a little higher than the bottoms of the notches 14 for a purpose which will appear.

Arranged in the medial vertical plane, between adjacent plates 17 is a rotary cutter disc 20 carried by shaft 21 and between each side of this cutter disc and the flanking plate 17 is a stripper finger 22 which is carried by a vertical plate 23 which lies immediately to the rear of the cutter disc 20 and is a trifle thicker than that disc.

Leading to the throat between the forwarding element W and the whole-fruit cutter disc 20 is a downwardly inclined fruit chute 25 through which the whole fruit will be delivered by gravity to the forwarding element.

Immediately to the rear of plate 23, each series of half-fruit pockets of the forwarding element W is covered by an arch-shaped cover 26 which extends around and beneath the forwarding element so as to retain the half-fruits in their respective pockets until they arrive beneath the forwarding element and to the throat of the juicer unit, to be described.

Arranged in medial vertical plane between each end pair of plates 12, near the lower part of the forwarding element W is a vertical cutter disc 27, said cutter disc being carried by shaft 28 journaled in the main frame, and immediately beyond the delivery end of each cover plate 26 (Fig. 6) is a divider plate 29 which is slightly thicker than the adjacent cutter disc.

The delivery end of each cover plate 26 leads to the throat of the juicer unit which comprises a segment-forwarding element 30 and a pulp-rubbing element 31. Each segment-forwarding element 30 is circumferentially grooved at 32 approximating the arc of the largest fruit segment which is to be handled, and this groove is provided with a plurality of transverse ribs 33 adapted to frictionally engage, preferably without penetration, the external surface of the skin of a fruit segment. Each element 30 is provided with a radially yieldable bushing 34 by means of which it is mounted upon shaft 35 to partake of the rotation of said shaft but capable of a radial yield approximating the variation in thickness of the fruit skins.

Figure 6:
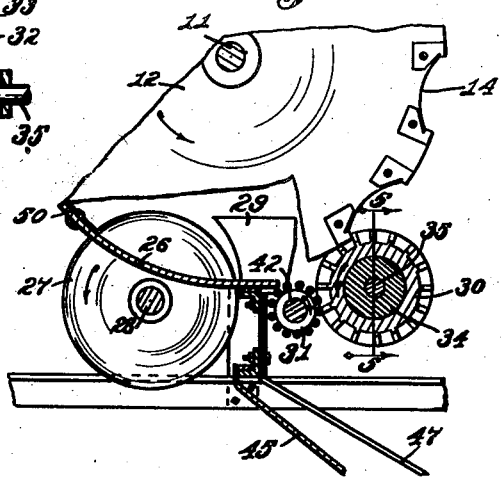
Fig. 6 is a fragmentary vertical section on one of the juicer units and adjacent parts.
Figure 7:
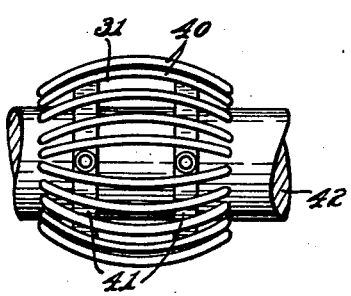
Fig. 7 is an elevation of one of the juice expressing elements of the juicer unit.

The pulp rubber 31 is formed by a circumferential series of arc-shaped wires or rods 40 attached to the peripheries of a pair of discs 41. The curvature of the rods 40 is arranged to be substantially concentric with the curvature of the groove 32 of the adjacent forwarding element 30 and the arrangement of these rods is such, as clearly indicated in Fig. 7, as to afford ready outlet therebetween for the expressed fruit juice and pulp. The several rubber elements 31 are mounted upon a shaft 42 and the two shafts 35 and 42 are rotated in opposite directions, as indicated in Fig. 6, shaft 42 being rotated at a very much higher speed than shaft 35.

Subtending the throats of the juicer elements is a juice-drainage plate 45 leading to a suitable juice receptacle 46 and interposed between the throats of the juicer elements and the plate 45 is a skin deflector guide conveniently composed of a plurality of parallel wires or rods 47 which serve to separate the fruit skins from the juice and deflect said skins to a suitable receptacle 48, the bottom of which may conveniently be an endless carrier (not shown) for the continuous removal of the accumulating denuded skins.

Interposed between the receiving edge of the quartering cutter 27 and the accompanying fruit halves are two fruit obstructors 50 balanced on the medial line of the runway and conveniently short pins sharpened at their rear edge, for a purpose which will appear. Shafts 11, 21, 35 and 42 are rotated at appropriate speeds, from a suitable source of power. We have found in practice that if the segment-forwarding element 30 is rotated at ninety revolutions per minute, the cooperating pulp-engaging element 31 (conveniently referred to as a burr) may best be rotated at about sixteen hundred revolutions per minute. The forwarding element W should be rotated at such speed as to force the fruits into as rapid cutting association with the cutter discs as possible without crowding the fruit unduly, and the cutter discs 20 and 27 should be rotated at comparatively high speed relative to the rotation of the forwarding element W.

The operation is as follows:

Whole fruit rolling in a single series down chute 25 and arriving at the periphery of the forwarding element W are successively picked up by the whole-fruit pocket notches of plate 17, one on each side of the whole-fruit cutter 20, and carried into engagement with and past said cutter 20, acting to cut the fruit in halves. At about the time the fruit is nearly halved, it is brought into engagement with the stripper fingers 22, the upper faces of which are slightly above the adjacent periphery of the cutter disc, but without destroying the forwarding contact of the rear tips 19 so that the fruit halves continue to be forwarded until they come in contact with the divider plate 23, the fruit halves at that time being substantially balanced upon the edges of the plate 17. The divider plate 23 unbalances the fruit halves and permits them to tip over in opposite directions into the adjacent fruit half-cradles whereupon the fruit halves are carried around beneath the forwarding element W, being retained within their position by the cover plates 26. Each fruit half, as it reaches the medial horizontal plane of the forwarding element W is likely to drop downwardly into engagement with the foresides of its retaining pocket, as it slides along the cover 26 until it comes in contact with the obstructors 50 which centralize it in the runway and detain it until the rear edge of the fruit pocket again contacts with the fruit, whereupon the fruit is driven over the obstructor and into cutting association with the quartering cutter 27 by which the fruit half is quartered and permitted to proceed in quarters to the divider plate 29 which deflects each quarter into the throat of the appropriate juicer unit, the forward polar tip of the fruit segment entering between the two elements of the juicer unit. The forwarding element 30 of the juicer unit, moving at relatively slow speed and engaging the outer surface of the skin of the fruit segment, forwards the fruit segment through the juicer unit, while the rods 40 of the relatively high speed burr 31 compress and rub the fruit polarwise of the segment, the skin being retained substantially in its normal arc and the forwarding elements yielding radially, due to the yieldable bushing 34, to compensate for variations in skin thickness. The fruit quarters arrive at the throats of the juicer units lying on one radial face but, as the tips of the segments become caught between the elements 30 and 31, the segments tend to centralize in the throat of the juicer element so that the juice and edible pulp is rapidly expressed by simultaneous radial compression and polarwise rubbing action which, in practice, is found to be exceedingly efficient.

The arc-shaped backing support of the segments, afforded by the arc-shaped circumferential groove of the forwarding element 30 during the radially outwardly compression and polarwise rubbing afforded by the burr rotating about an axis concentric with the curvature of the backing support, results in a thorough bursting of the juice cells of the fruit and a rapid and thorough expression of the juice and removal of the edible pulp without substantial cracking or bursting of the skin, thereby avoiding expression of the bitter oils and juices of the skin to comingle with the desired fruit juice.

We claim as our invention:

1. Means for extracting juice from segments of citrus fruits, comprising a forwarding roll having a skin-engaging circumferential groove the bottom of which lies between its mouth and the axis of rotation of the roll and capable of abutting a segment skin as to its external arc against substantial disruption of oil cells of the fruit skin and of feeding a fruit segment tangentially, a burr-roll having a pulp-engaging periphery axially arched mounted adjacent the forwarding roll and rotating within the groove thereof, and means for rotating said rolls in opposite directions, the burr-roll at greater peripheral speed than the forwarding roll, whereby a fruit segment of substantially less than 180° included angle may be projected polarwise between the two rolls and the juice rubbed therefrom progressively without substantial disruption of the oil cells of the skin.

2. In a segmenter and juicer of citrus fruits, means for receiving and halving such fruits, means for cutting the fruit halves to define fruit segments having two pulp faces defining an included angle of substantially less than 180 degrees, juicing means comprising a forwarding roll having a skin-engaging circumferential groove the bottom of which lies between its mouth and the axis of rotation of the roll and arranged in position to receive a stream of such fruit segments and capable of abutting a segment skin against substantial disruption of oil cells of the fruit skin and of feeding the fruit segments tangentially, a burr-roll having a pulp-engaging periphery axially arched mounted adjacent the forwarding roll and rotating within the groove thereof, and means for rotating said rolls, the burr-roll at greater peripheral speed than the forwarding roll, whereby fruit segments of less than 180 degrees included angle produced by the cutting means will be projected tangentially between the rolls and the juice rubbed therefrom progressively without substantial disruption of oil cells of the skin.

3. A citrus friut segmenter, comprising a drum rotatable on a horizontal axis, said drum having a medial circumferential series of pockets capable of receiving and forwarding whole fruits and two circumferential series of pockets flanking the medial series of pockets and capable of receiving and forwarding half-fruits, a cutter co-ordinated with the upper run of said medial pockets to engage and halve the whole fruits, means retaining the half-fruits in said flanking pockets during a portion of the lower runs of said pockets, and cutting means arranged adjacent the lower runs of the half-fruit pockets for cutting the half-fruits to define segments having included angle substantially less than 180 degrees.

4. A citrus fruit segmenter of the character specified in claim 3 and including juicer means arranged to receive a continuous stream of fruit segments and separate the juice and skin without substantial distortion of the skin.

5. A citrus fruit juice extracting machine comprising means for feeding whole fruit to the machine, means for severing each fruit into halves, means for positioning the halves with their cut faces facing in the same direction, juice extracting means, means for conveying the halves in a definite path toward the extracting means, a cutter blade located adjacent the conveying means and so positioned with respect to the path of the half fruit as to cut the half fruit on the cut face thereof to define sections, the extracting means comprising two opposed rotatable ribbed rolls, the said rolls being located adjacent the conveyor and so positioned with respect to the path of the cut fruit that the fruit is fed between the rolls, one of the rolls contacting the outer surface of the rind of the fruit and operating as a forwarding roll, and the other roll contacting the cut face of the fruit and operating to ream the pulp from the skin, means for simultaneously rotating the rolls in opposite directions and for rotating the roll which contacts the cut face at a higher rate of speed than the roll which contacts the rind.

6. Means for extracting juice from segments of citrus fruits, comprising a cylindrical forwarding roll having a concave skin-engaging circumferential groove capable of abutting a segment skin as to its transverse arc against substantial distortion and of feeding a fruit segment polarwise, a burr-roll having a pulp-engaging periphery axially arched mounted adjacent the forwarding roll and rotating within the groove thereof, and means for rotating said rolls in opposite directions, the burr-roll at greater peripheral speed than the forwarding roll, whereby a fruit segment may be projected polarwise between the two rolls and the juice expressed therefrom progressively from one tip toward the other tip without substantial distortion of the skin.

7. A mechanism for extracting juice from citrus fruit comprising a feed roll and a reamer roll arranged with their peripheral surfaces in side by side relation for rotation about their axes, said feed roll having a concave peripheral face for engagement with the skins of fruit sections introduced between the rolls, and the reamer roll having a convex reaming surface arranged in complementary relation to the concave face of the feed roll for engagement with the pulp of said fruit sections, and means for driving said rolls in opposite directions, the reamer roll at a greater peripheral speed than the feed roll.

8. A mechanism for extracting juice from citrus fruit segments comprising a feed roll and a coacting reamer roll arranged with their peripheral surfaces in side by side non-contacting relation, means for simultaneously rotating said rolls in opposite directions, the reamer roll at a greater peripheral speed than the feed roll, cutting mechanism for cutting whole fruit to define skin-adherent sections substantially smaller than halves to minimize skin rupture during passage between the feed roll and reamer roll, and non-skin-rupturing guiding means arranged between the cutting means and said rolls for guiding and presenting the freshly defined fruit sections uncrushed to the receiving crotch between said rolls.

9. A mechanism for extracting juice from citrus fruit segments comprising a feed roll and a coacting reamer roll arranged with their peripheral surfaces in side by side non-contacting relation, means for simultaneously rotating said rolls in opposite directions, the reamer roll at a greater peripheral speed than the feed roll, cutting mechanism for cutting whole fruit to define skin-adherent sections substantially smaller than halves to minimize skin rupture during passage between the feed roll and reamer roll, and non-skin-rupturing guiding means arranged between the cutting means and said rolls for guiding and presenting the freshly defined fruit sections uncrushed and endwise to the receiving crotch between said rolls.

10. A mechanism for extracting juice from citrus fruit comprising a feed roll and a reamer roll arranged with their peripheral surfaces in side by side relation for rotation about their axes, said feed roll having a concave peripheral face and the reamer roll having a convex reaming surface arranged in complementary relation to the concave face of the feed roll, means for rotating said rolls in opposite directions, the reamer roll at a greater peripheral speed than the feed roll, a cutting mechanism for cutting the whole fruit to define sections smaller than halves to minimize tearing of the skins thereof when the pieces of cut fruit are passed between said rolls, and means for directing the cut fruit from the cutting means to and between said rolls to present the pulp of the fruit to the reamer roll.

11. A citrus fruit juice extracting machine comprising means for feeding whole fruit to the machine, means for severing each fruit into halves, means for positioning the halves with their cut faces facing in the same direction, juice extracting means, means for conveying the halves in a definite path toward the extracting means, a cutter blade located adjacent the conveying means and so positioned with respect to the path of the half fruit as to cut the half fruit on the cut face thereof to define sections, the extracting means comprising two opposed closely spaced members rotatable on substantially parallel axes transversely of said path, the said members being located adjacent the conveyor and so positioned with respect to the path of the cut fruit that the fruit is fed between the members, one of the members contacting the outer face of the rind of the fruit and operating as a forwarding member, the other member comprising a ribbed roll contacting the cut face of the fruit and operating to ream the pulp from the skin, means for simultaneously rotating the members in opposite directions and for rotating the roll which contacts the cut face at a higher peripheral speed than the speed of the member which contacts the rind.

12. A citrus-fruit juice-extracting machine comprising, means for positively forwarding half-fruits serially along a predetermined path with their cut faces presented in the same direction, a cutter blade located adjacent said forwarding means and so positioned with respect to the path of the half-fruits as to cut the half-fruits on the cut faces thereof and through some skin to define sections, and juice-extracting means comprising two rotatable ribbed rolls, the said rolls being located to receive such defined sections from the forwarding means and so positioned with respect to the path of the defined sections that said sections are positively fed between the rolls, one of the rolls contacting the outer surface of the skin of the fruit and operating as a forwarding roll, and the other roll contacting the cut face of the fruit and operating to ream the pulp from the skin, means for simultaneously rotating the rolls in opposite directions and for rotating the roll which contacts the cut face at a higher rate of speed than the roll which contacts the skin.

13. A citrus-fruit juice-extracting machine comprising, means for forwarding half-fruits serially along a predetermined path with their cut faces presented in the same direction, a cutter blade located adjacent said forwarding means and so positioned with respect to the path of the half-fruits as to cut the half-fruits on the cut faces thereof and through some skin to define sections, and juice-extracting means comprising two rotatable ribbed rolls, the said rolls being located to receive such defined sections from the forwarding means and so positioned with respect to the path of the defined sections that said sections are fed between the rolls, one of the rolls contacting the outer surface of the skin of the fruit and operating as a forwarding roll, and the other roll contacting the cut face of the fruit and operating to ream the pulp from the skin, means for simultaneously rotating the rolls in opposite directions and for rotating the roll which contacts the cut face at a higher rate of speed than the roll which contacts the skin.

14. A citrus-fruit juice-extracting machine comprising, a juice-extracting unit composed of a forwarding roll having a concave skin-engaging peripheral groove capable of abutting a segment skin of a defined fruit segment less than one-half fruit to minimize skin rupture and capable of feeding such fruit segment polarwise, a burr-roll having a pulp-engaging periphery axially arched, mounted adjacent the forwarding roll and rotating within the groove thereof, means for rotating said rolls simultaneously in opposite directions, the burr-roll at a higher peripheral speed than the forwarding roll, and means for delivering such aforesaid defined fruit segments to the crotch formed by said two rolls.

15. A fruit juicer comprising, a rotary fruit-segment forwarder having a concave peripheral groove to receive the skin face of fruit segments and forward the same polarwise, and a coordinated pulp-engaging rotary burr axially arched and placed to lie in said concave groove, and means for simultaneously rotating said forwarder and burr in opposite directions, with the burr at a higher peripheral speed.

16. A fruit juicer comprising, a rotary fruit-segment forwarder having a concave peripheral groove to receive the skin face of fruit segments, a coordinated pulp-engaging rotary burr comprising a series of circumferentially spaced rods each arched axially of the burr and rotatable within the groove of the forwarder, and means for simultaneously rotating said forwarder and burr, with the burr at a higher peripheral speed.

17. A fruit juicer comprising, a rotary fruit-skin engaging element having a peripheral groove arc-shaped in axial section approximating in extent and curvature the arc of fruit segments of less than 180 degrees, a coordinated pulp-engaging rotary burr having a pulp-engaging periphery axially arched substantially parallel with said groove and nested in said groove, and means for rotating said two elements in opposite directions, the burr substantially faster than the skin-engaging element.

18. A fruit juicer comprising, a rotary fruit-skin engaging element having a peripheral groove arc-shaped in axial section approximating in extent and curvature the arc of fruit segments of less than 180 degrees, a coordinated pulp-engaging rotary burr having a pulp-engaging periphery axially arched, circumferentially spaced rods substantially parallel with said groove and nested in said groove, and means for rotating said two elements in opposite directions, the burr substantially faster than the skin-engaging element.

19. A mechanism for extracting juice from citrus fruit comprising, a forwarding roll and a reamer roll mounted in side by side relation for rotation about parallel axes, said feed roll having a concave peripheral face for such engagement with the skins of defined fruit sections of less than 180 degrees introduced between the rolls so as to forward the same polarwise between the rolls, and the reamer roll having a convex reaming surface arranged in complementary relation to the concave peripheral face of the feed roll for progressive rubbing engagement with the pulp of such fruit sections, and means for driving said rolls in opposite directions, the reamer roll at a greater peripheral speed than the feed roll.

20. Means for manipulating uncrushed skin-bearing citrus fruit segments which have been defined by cutting the cut faces and some of the skin of fruit halves which comprises, means for feeding such fruit sections in series parallel with the lengths of such sections, a juicer unit arranged to receive such uncrushed fruit sections in series, said juicer unit comprising a forwarding roll having its circumferential periphery formed to engage the skins of such sections and propel them in the direction of their lengths, a burr roll mounted with its circumferential periphery in cooperative relation with the circumferential periphery of the forwarding roll and spaced therefrom approximately a skin thickness and formed to rubbingly contact the pulp faces of such fruit sections, and means for simultaneously rotating said rolls in opposite directions, the burr roll at a peripheral speed higher than that of the forwarding roll.

21. A machine for extracting juice from citrus fruit sections, comprising a feed roll and a reamer roll arranged with their circumferential peripheral surfaces in side-by-side relation and spaced for an operative engagement with such sections such as to cause the rinds of said sections to be fed whole between the rolls, means for rotating said rolls in oppoite directions, the reamer roll at a greater peripheral speed than the feed roll, and means for positioning and delivering said fruit sections uncrushed to and between said rolls in position to present the pulp sides of the sections to said reamer roll.

22. A machine for extracting juice from citrus fruit sections, comprising a feed roll and a reamer roll arranged with their circumferential peripheral surfaces in side-by-side relation and spaced for an operative engagement with such sections such as to cause the rinds of such sections to be fed whole between the rolls, means for rotating said rolls in opposite directions, the reamer roll at a greater peripheral speed than the feed roll, and means for positioning and delivering such fruit sections uncrushed polarwise to and between said rolls and in position to present the pulp sides of the sections to said reamer roll.

23. A machine for extracting juice from citrus fruits, comprising a rotary fruit segment forwarder roll having a concave peripheral groove to receive the skin face of fruit segments and with its bottom between its mouth and the axis of the roll, a coordinated pulp engaging rotary burr axially arched and rotatable within the groove of the forwarder on an axis lying substantially parallel to the axis of said roll, and means for simultaneously rotating said forwarder and burr with the burr at a higher peripheral speed.

24. A machine for extracting juice from citrus fruits, comprising means for cutting the fruit into sections, a feed roll and a reamer roll arranged with their peripheral surfaces in side-by-side relation between their respective axes and spaced for operative engagement with such sections such as to cause the rinds of such sections to be fed whole and substantially uncrushed between the rolls, measn for rotating said rolls in opposite directions, the reamer roll at a greater peripheral speed than the feed roll, and means for receiving such fruit sections and delivering them uncrushed to said rolls in position to present the pulp sides of the sections to said reamer roll.

25. A citrus fruit juice extracting machine, comprising means for cutting fruit to define them into sections, juice extracting means, means for directing the fruit sections in a definite path toward the extracting means, said extracting means comprising two opposed rotatable rolls arranged transversely of said path with their peripheries in side-by-side relation, the said rolls being so positioned and spaced with respect to the path of the cut fruit that the rinds of such sections will be fed whole between the rolls and between the axes thereof, one of said rolls contacting the outer face of the defined sections of the fruit and operating as a forwarding roll, the other roll contacting the pulp of the fruit sections and operating to ream the pulp from the rind, and means for simultaneously rotating the rolls in opposite directions and for rotating the roll which contacts the pulp at a higher peripheral speed than that of the roll which contacts the rind.

RALPH POLK, Sr.
RALPH POLK, Jr.